United States Patent Office.

JOHN FAIRCHILD, OF EAGLEVILLE, OHIO.

Letters Patent No. 68,720, dated September 10, 1867.

IMPROVED CEMENT COMPOUND.

*The Schedule referred to in these Letters Patent and making part of the same.*

TO ALL WHOM IT MAY CONCERN:

Be it known that I, JOHN FAIRCHILD, of Eagleville, in the county of Ashtabula, and State of Ohio, have invented a new and improved Cement Compound for roofing purposes; and I do hereby declare that the following is a full, clear, and exact description of the ingredients used, and the manner of compounding the same.

The ingredients used and their proportion to one another are, one part fine water-lime, one part fine silicious sand, one part coal tar. Sulphur and sulphate of lime in the proportions hereinafter stated.

In forming this compound the water-lime and silicious sand are first mixed together, after which the coal tar, in a heated state, is added, and the whole thoroughly incorporated together. The tenacity and flexibility of the compound are increased by mixing sulphur with the heated coal tar, in the proportion of one pound of sulphur to twenty gallons of tar.

Greater hardness is obtained by the addition of sulphate of lime in the same proportion as above mentioned for sulphur.

This composition, in a plastic state, may be spread properly on the roof by using a common cement-trowel.

What I claim as my invention, and desire to secure by Letters Patent, is—

The composition herein described, compounded in the manner and for the purpose set forth.

JOHN FAIRCHILD.

Witnesses:
A. H. HOWELLS,
W. C. HOWELLS.